United States Patent
Chayat et al.

(10) Patent No.: US 7,483,367 B2
(45) Date of Patent: Jan. 27, 2009

(54) HIERARCHICAL PREAMBLE CONSTRUCTIONS FOR OFDMA BASED ON COMPLEMENTARY SEQUENCES

(75) Inventors: Naftali Chayat, Kfar Sava (IL); Tal Katz, Kirvat Ono (IL)

(73) Assignee: Alvaron Ltd., Tel-Aviv (IL)

( * ) Notice: Subject to any disclaimer, the term of this patent is extended or adjusted under 35 U.S.C. 154(b) by 633 days.

(21) Appl. No.: 10/934,908

(22) Filed: Sep. 2, 2004

(65) Prior Publication Data

US 2005/0036481 A1 Feb. 17, 2005

Related U.S. Application Data

(63) Continuation of application No. PCT/IL03/00166, filed on Mar. 4, 2003.

(60) Provisional application No. 60/362,299, filed on Mar. 7, 2002.

(51) Int. Cl.
*H04J 11/00* (2006.01)
(52) U.S. Cl. .................. 370/208; 370/232
(58) Field of Classification Search .......... 370/19, 370/203, 430, 206, 208, 210, 232; 375/343; 725/78
See application file for complete search history.

(56) References Cited

U.S. PATENT DOCUMENTS

| | | | | |
|---|---|---|---|---|
| 5,406,551 A * | 4/1995 | Saito et al. | ............... | 370/203 |
| 6,282,185 B1 | 8/2001 | Hakkinen | | |
| 6,314,146 B1 * | 11/2001 | Tellado et al. | ............... | 375/346 |
| 6,567,482 B1 * | 5/2003 | Popovic' | ............... | 375/343 |
| 6,654,339 B1 * | 11/2003 | Bohnke et al. | ............... | 370/203 |
| 6,928,084 B2 * | 8/2005 | Cimini et al. | ............... | 370/430 |
| 2002/0181390 A1 | 12/2002 | Mody et al. | | |
| 2003/0002471 A1 | 1/2003 | Crawford et al. | | |
| 2003/0076777 A1 * | 4/2003 | Stuber et al. | ............... | 370/206 |
| 2003/0086363 A1 | 5/2003 | Hernandez | | |

FOREIGN PATENT DOCUMENTS

EP    0 902 574 A2    12/1997

(Continued)

OTHER PUBLICATIONS

Jones et al, "Block Coding Scheme For Reduction Of Peak To Mean Envelope Power Ratio Of Multicarrier Transmission Schemes", Electronics Letters, IEE Stevenage, GM, vol. 30, No. 25, Dec 8, 1994; pp. 2098-2099.

(Continued)

*Primary Examiner*—Hassan Kizou
*Assistant Examiner*—Emmanuel Maglo
(74) *Attorney, Agent, or Firm*—Browdy and Neimark, P.L.L.C.

(57) ABSTRACT

A method of implementing OFDMA systems with enhanced preamble properties is presented. The transmit power is boosted during a preamble transmission, by utilizing preambles with a low Peak-to-Average Power Ratio (PAPR) property, as opposed to higher PAPR during the data portion of the transmission. Further, sets of preambles satisfying good PAPR properties in OFDMA systems are presented. The preambles satisfy a low Peak-to-Average Power Ratio (PAPR) property for numerous subsets of the usable subcarrier set. A method for generating a hierarchical set of preambles for OFDMA communication systems is described. The method hinges on the good PAPR properties of Golay's complementary sequences, and on hierarchical construction methods of larger complementary sequences out of smaller ones.

20 Claims, 2 Drawing Sheets

FOREIGN PATENT DOCUMENTS

| EP | 1 061 705 A1 | 6/1999 |
|---|---|---|
| EP | 1 037 442 A2 | 3/2000 |

OTHER PUBLICATIONS

Ho et al "Construction of Spectrally Efficient Low-Crest Waveforms for Multicarrier CDMA System", 1995 Forth IEEE International Conference on Universal Personal Communications Record. Gateway to the 21st Century. Tokyo Nov. 6-10, 1995, IEEE vol. Conf. 4, Nov. 6, 2006, pp. 522-526.

Hunziker et al, "Evaluation of Coding and Modulation Schemes Based on Golay Complementary Sequences for Efficient OFDM Transmission", Vehicular Technology Conference 1998 VIC 98 48th IEEE Ottawa Ont. Canada May 18-21, 1998, New York, NY IEEE US vol. 2, 1998-0518, pp. 1631-1635.

Richard D.J. van Nee, "OFDM Codes for Peak-to-Average Power Reduction and Error Correction", Global Telecommunications Conference, 1996. Globecom '96, "Communications: The Key to Global Prosperity" London UK Nov. 18-22, 1996, New York, NY, USA IEEE vol. 1, 18—Nov. 18, 1996, pp. 740-744 Chapters II and III.

Davis et al, "Peak-to-Mean Power Control in OFDM< Golay Complementary Sequences and Reed-Muller Codes", HP Laboratories Technical Report, vol. HPL-97-158, Dec. 1997 pp. 1-26.

Awater, G. A. ; van Nee, D. J. R.,"Implementation of the Magic WAND wireless ATM modem", ICC'99.

IEEE 802. 11b standard, High Rate Direct Sequence PHY extension for Wireless LANs.

IEEE 802. 16a,"Air Interface for Fixed Broadband Wireless Access Systems- Medium Access Control Modifications and Additional Physical Layer Specifications for 2-11 GHz", Draft 7, Nov. 2002.

ETSI EN301 958,"Digital Video Broadcasting (DVB) ; Interaction channel for Digital Terrestrial Television (RCT) incorporating Multiple Access OFDM", Aug. 2001.

Y. Li, N. Sollenberger, "Clustered OFDM With Channel Estimation for High Rate Wireless Data", IEEE Trans. on Comm., Dec. 2001, pp. 2071-2076.

M. J. E. Golay, Complementary Series, IRE Trans. On Information Th., Apr. 1961, pp. 82-87.

R. Frank, "Polyphase Complementary Codes", IEEE Trans. on Information Th., Nov. 1980 pp. 641-647.

A. Gavish and A. Lempel "On Ternary Complementary Sequences" IEEE Trans. On Information Th., Mar. 1994, pp. 522-526.

Li G. Y. Simplified Channel Estimation for OFDM Systems with Multiple Transmit Antennas, IEEE transactions on Wireless Communications, Jan. 2002, vol. 1, No. 1, pp. 67-73.

* cited by examiner

HIERARCHICAL PREAMBLE CONSTRUCTIONS FOR OFDMA BASED ON COMPLEMENTARY SEQUENCES

CROSS-REFERENCE TO RELATED APPLICATION

The present application is a continuation of International Application No. PCT/IL03/00166 which was filed on Mar. 4, 2003.

FIELD OF THE INVENTION

The present invention relates to Orthogonal Frequency Division Multiple Access (OFDMA) systems, and in particular to construction of preambles for transmission of message bursts.

BACKGROUND OF THE INVENTION

The Orthogonal Frequency Division Multiple Access (OFDMA) systems are similar to Orthogonal Frequency Division Multiplex (OFDM) systems in the sense that the information is spread over multiple subcarriers in the frequency domain and is transmitted after converting the information to the time domain using a Fourier transform. The amount of subcarriers available to a system is determined by a ratio of the assigned frequency channel to the frequency spacing between the subcarriers.

The main difference between OFDM and OFDMA is that with OFDM a single transmitter uses a whole range of subcarriers to transmit its information, while in OFDMA different transmitters are assigned disjoint sets of subcarriers, and each user sends his information on the subcarriers assigned to him.

The amount of subcarriers assigned to each transmitter may vary according to the traffic demands of each user in a multiple access system. The assignment is usually performed in groups of subcarriers, denoted as subchannels. The OFDMA idea became popular recently in the context of wireless access systems. There are several variants of division of the subcarriers into subchannels, starting from irregular methods such as in IEEE802.16a [4] and in DVB-RCT [5], through contiguous clusters of subcarriers [3] and concluding with regularly interleaved sets.

In burst communication systems each transmission typically starts with a preamble, which is used for synchronization and channel estimation. Usually such preamble is structured as one or two OFDM symbols with predefined values modulating each of the subcarriers. The set of predefined values is chosen to satisfy several criteria. One is that all the values have the same modulus, to ease the channel estimation. Only the values corresponding to the assigned subcarriers are non-zero. Another criterion is that the preamble time domain waveform has a low Peak-to-Average Power Ratio (PAPR) property, to avoid excessive distortion in the power amplifier.

Typically OFDM systems produce high PAPR waveforms, since at each time instant numerous data-dependent contributions add up to a Gaussian-like waveform. As a result, the OFDM transmitters utilize their power amplifiers at a small fraction of their peak output, typically at 8-11 dB backoff. By using as a preamble, a carefully crafted set of subcarrier modulation values, the PAPR of the preamble can be kept at about 3 dB, significantly less than the values typical to data. This property is beneficial in that during the channel estimation phase the signal experiences smaller distortion, resulting in a more accurate estimate.

The preambles in OFDMA systems are designed to excite only the subcarriers that are assigned to the user. The OFDMA adds a new twist to the problem, since not only a single preamble with good PAPR properties needs to be designed, but rather a family of preambles for each subset of subcarriers that can be allocated to a single transmitter.

PRIOR ART

There are several recent works searching for families of waveforms with low PAPR. One set of waveforms is based on Golay's complementary sequences, which have the property that their Fourier transform has a PAPR of at most 2, which is equivalent to 3 dB. Van Nee has shown [1] how to use sets of complementary sequences in conjunction with OFDM modulation for conveying information with low PAPR waveforms. This invention was implemented in the "Magic Wand" wireless ATM demonstrator [2]. In this work the aim was to achieve low PAPR property for the data portion of the signal rather than for the preamble. Similarly, Awater and van Nee, in U.S. Pat. No. 6,005,840, disclose an OFDM transmitter system that uses complementary codes to reduce the power-to-average power (PAP) ratio of the transmitted signal. Sets of complementary sequences are also used to convey information in time domain, which is not OFDM, in a popular 802.11b Wireless LAN standard, where a dual property is used. The low PAPR of the Fourier transform in frequency domain results in better immunity to interference and to multipath.

In all the above applications the goal is to convey data by selecting one out of several sequences, all the sequences having the same length. By contrast, in OFDMA systems, a set of sequences of different sizes is needed, each corresponding to a possible allocation of a different subcarrier set to each user.

REFERENCES

[1] R. D. J. van Nee, "OFDM codes for peak-to-average power reduction and error correction", Global Telecommunications Conference, London, November 1996.

[2] Awater, G. A.; van Nee, D. J. R., "Implementation of the Magic WAND wireless ATM modem", ICC'99.

[3] IEEE 802.11b standard, High Rate Direct Sequence PHY extension for Wireless LANs.

[4] IEEE 802.16a, "Air Interface for Fixed Broadband Wireless Access Systems—Medium Access Control Modifications and Additional Physical Layer Specifications for 2-11 GHz", Draft 7, November 2002

[5] ETSI EN301 958, "Digital Video Broadcasting (DVB); Interaction channel for Digital Terrestrial Television (RCT) incorporating Multiple Access OFDM", August 2001

[6] Y. Li, N. Sollenberger, "Clustered OFDM With Channel Estimation for High Rate Wireless Data", IEEE Trans. on Comm., December 2001, pp. 2071-2076

[7] M. J. E. Golay, Complementary Series, IRE Trans. On Information Th., April 1961, pp. 82-87

[8] R. Frank, "Polyphase Complementary Codes", IEEE Trans. on Information Th., November 1980, pp. 641-647

[9] A. Gavish and A. Lempel, "On Ternary Complementary Sequences", IEEE Trans. on Information Th., March 1994, pp. 522-526.

SUMMARY OF THE INVENTION

Therefore, it is a principal object of the present invention to create a hierarchical set of preambles of different size in order to serve as low- Peak-to-Average Power Ratio (PAPR) preambles for an Orthogonal Frequency Division Multiple Access (OFDMA) system.

A method is disclosed of implementing OFDMA systems with enhanced preamble properties. The transmit power is boosted during a preamble transmission, by utilizing preambles with a low Peak-to-Average Power Ratio (PAPR) property, as opposed to higher PAPR during the data portion of the transmission. Further, sets of preambles satisfying good PAPR properties in OFDMA systems are presented. The preambles satisfy a low Peak-to-Average Power Ratio (PAPR) property for numerous subsets of the usable subcarrier set. A method for generating a hierarchical set of preambles for OFDMA communication systems is described. The method hinges on the good PAPR properties of Golay's complementary sequences, and on hierarchical construction methods of larger complementary sequences out of smaller ones.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein.

DETAILED DESCRIPTION OF THE PREFERRED EMBODIMENTS

The first element of the invention relates to the utilization of the low-PAPR preamble waveforms in an Orthogonal Frequency Division Multiple (OFDM) system, not only for the purpose of reducing the power amplifier distortion, but rather extracting higher average power during the preamble. According to the present invention it is suggested that the average power of the preamble is boosted relative to the data region in order to improve, for example, the channel estimation accuracy and burst detection probability. The benefits of this technique are independent of the method used to construct the low-PAPR sequence, whether it is generated by mathematical construction or it is a result of computer search.

Figure 1:
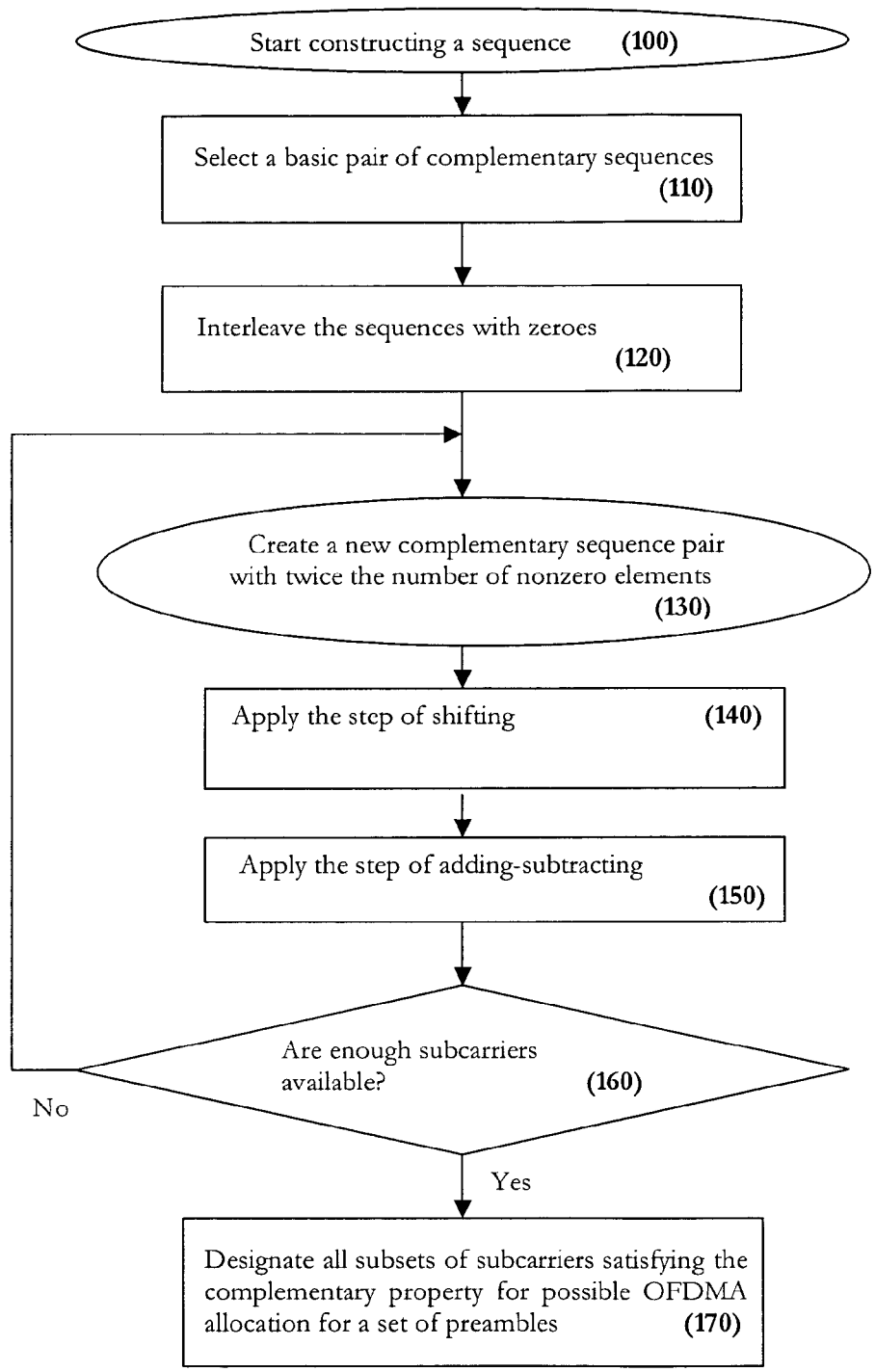
FIG. 1 is a flow chart illustrating a method of constructing a sequence of values to be used for modulating the subcarriers of a preamble in an OFDMA system, constructed in accordance with the principles of the present invention.

FIG. 1 is a flow chart illustrating a method of constructing a sequence of values to be used for modulating the subcarriers of a preamble in an OFDMA system 100, constructed in accordance with the principles of the present invention. The purpose is to have low PAPR both for the whole sequence and for numerous subsets of the sequence based a series of steps. The first step is to select the basic pair of complementary sequences 110. The next step is to interleave the sequences with zeroes according to the desired spread of subcarriers over frequency in a basic subcarrier group 120. This is followed by repeating the step of creating new complementary sequence pairs with twice the number of nonzero elements 130, by applying the steps of shifting 140 and adding-subtracting 150 until a sequence is created containing all the desired nonzero subcarriers at the desired locations 160.

Figure 2A:
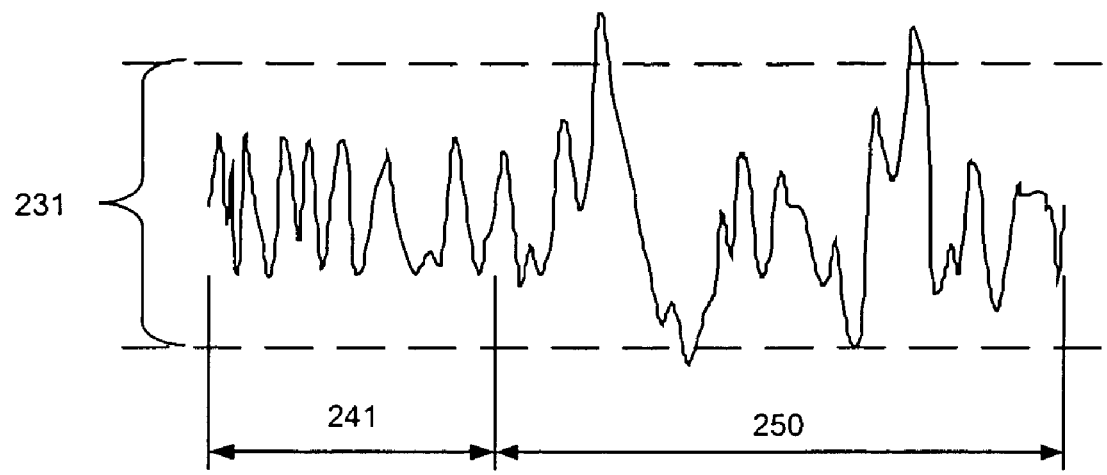
FIGS. 2a and 2b are illustrations of time domain effect, incurred without and with boosting of a low-PAPR preamble, respectively, constructed in accordance with the principles of the present invention.
Figure 2B:
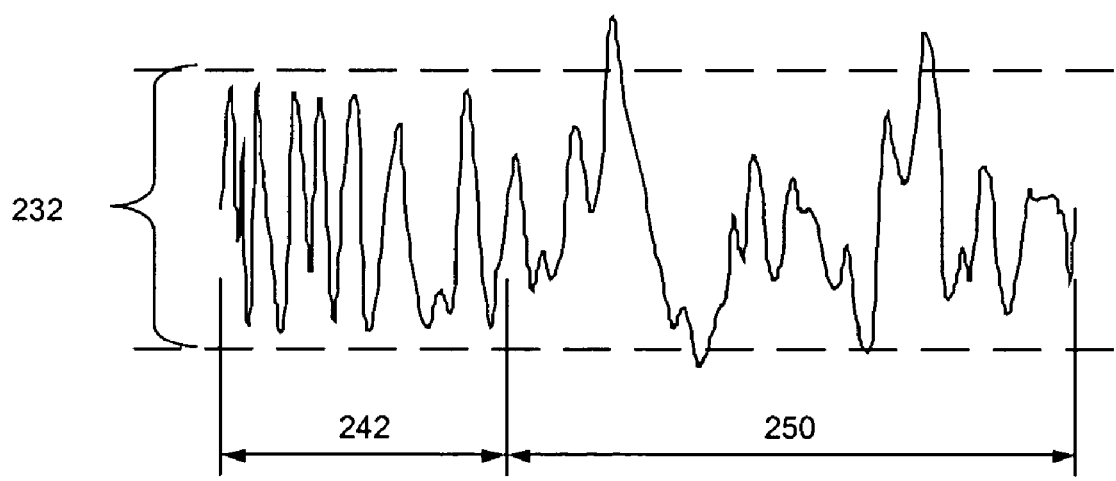

FIGS. 2a and 2b are illustrations of time domain effect, incurred without and with boosting of a low-PAPR preamble, respectively, constructed in accordance with the principles of the present invention. FIG. 2a shows the linear region of a power amplifier 231 without preamble boosting 241. By contrast, FIG. 2b shows the linear region of a power amplifier 232 with preamble boosting 242. The data regions 250 are seen to be the same for both.

The second element of the invention is related to implementation of constructed preamble families in OFDM and OFDMA systems, wherein all members of the family achieve the low-PAPR property by the virtue of being complementary sequences.

According to the preferred embodiment of the present invention, the method of generating sets of OFDMA preambles utilizes the methods for hierarchical construction of long complementary sequences from short seed sequences, developed initially by Golay in his seminal paper [7]. Golay initially dealt with binary sequences; his work was generalized to polyphase, and in particular quadriphase, sequences by R. Frank [8] and to three valued (−1, 0 and +1) sequences by Gavish and Lempel [9]. The present invention utilizes and further generalizes the abovementioned works towards construction of hierarchical sets of OFDMA preambles.

Complex valued, discrete time, finite length sequences A and B are called a complementary pair, if their autocorrelations add up to a delta-function. An example of such a pair is:

$A=(+1,+1,+1,-1); B=(+1,+1,-1,+1)$ $\text{Corr}(A,A)=(-1,0,1,4,1,0,-1);$ $\text{Corr}(B,B)=(1,0,-1,4,-1,0,1)$ $\text{Corr}(A,A)+\text{Corr}(B,B)=(0,0,0,8,0,0,0)=\text{delta function.}$ If both sequences have same the energy, then their Fourier transforms exhibit the property proved in the appendix, that its PAPR is at most 2, which is equivalent to 3 dB.

The following is an overview of several properties of complementary sequences and several construction methods of longer sequences from shorter ones:

1) If A and B are a complementary pair, then so are A and B, each interleaved with zeros. For example, if:

$A=(+1,+1,+1,-1)$ $B=(+1,+1,-1,+1)$ are a complementary pair, so are:

$A'=(+1,0,+1,0,+1,0,-1)$ $B'=(+1,0,+1,0,-1,0,+1)$ and also the pair:

$A''=(+1,0,0,0,+1,0,0,0,+1,0,0,0,-1)$ $B'''=(+1,0,0,0,+1,0,0,0,-1,0,0,0,+1)$

2) If A and B are a complementary pair, then appending or prepending zeros to either A or B, creates a complementary pair. For example, if:

$A=(+1,+1,+1,-1)$ $B=(+1,+1,-1,+1)$ are a complementary pair, so are:

$A'=(+1,+1,+1,-1,0,0,0,0)$ (four zeros appended)

$B'=(0,0,0,0,+1,+1,-1,+1)$ (four zeros prepended)

Another example: if $$A=(+1,0,+1,0,+1,0,-1)$$

$$B=(+1,0,+1,0,-1,0,+1)$$

are a complementary pair, so are:

$$A'=(+1,0,+1,0,+1,0,-1,0) \text{ (a zero appended)}$$

$$B'=(0,+1,0,+1,0,-1,0,+1) \text{ (a zero prepended)}$$

3) If A and B are a complementary pair, so are A+B and A−B. Example: since $$A=(+1,+1,+1,-1,0,0,0,0)$$

$$B=(0,0,0,0,+1,+1,-1,+1)$$

are a complementary pair, therefore so are:

$$A'=(+1,+1,+1,-1,+1,+1,-1,+1)$$

$$B'=(+1,+1,+1,-1,-1,-1,+1,-1)$$

Another example: since $$A'=(+1,0,+1,0,+1,0,-1,0)$$

$$B'=(0,+1,0,+1,0,-1,0,+1)$$

are a complementary pair, so are:

$$A'=(+1,+1,+1,+1,+1,-1,-1,+1)(\text{sum})$$

$$B'=(+1,-1,+1,-1,+1,+1,-1,-1)(\text{difference})$$

4) If A and B are a complementary pair, so are a concatenation of A and B and the concatenation of A and −B. This results from previous properties, and actually is shown in the first example of 3.
5) If A and B are a complementary pair, so are the element-wise interleaving of A and B and the element-wise interleaving of A and −B. This results from previous properties, and actually is shown in the second example of 3.
6) Property 4 can be expanded to contain zeros between A and B during concatenation. This can be shown by the following two-stage process:

$$A=(+1,+1,+1,-1)$$

$$B=(+1,+1,-1,+1)$$

In the first stage six zeroes are appended and prepended, correspondingly:

$$A'=(+1,+1,+1,-1,0,0,0,0,0)$$

$$B'=(0,0,0,0,0,+1,+1,-1,+1)$$

In second stage the sum and the difference are formed:

$$A''=(+1,+1,+1,+1,0,0,+1,+1,-1,+1)(\text{sum})$$

$$B''=(+1,+1,+1,-1,0,0,-1,-1,+1,-1)(\text{difference})$$

Although the properties above were exemplified with binary values of +1 and −1, those properties carry towards sequences composed of complex numbers. After the mathematical preliminary an example can be shown of generating a set of preambles for an OFDMA communication system. Assume that the communication system utilizes 12 subcarriers out of 13, with the middle one being unused. The restriction on not using the middle subcarrier is encountered in several OFDM systems for implementation considerations related to carrier leakage in quadrature modulators. It is preferable to assign subcarriers to users in groups of three consecutive subcarriers (clusters). This is done by starting with a pair of quadriphase complementary sequences of length 3 (see [5]):

$$A=(+1,+1,-1)$$

$$B=(+1,+j,+1)$$

From here is formed four subsequences:

$$S1=(+1,+1,-1,0,0,0,0,0,0,0,0,0)$$

$$S2=(0,0,0,0,0,0,+1,+j,+1,0,0,0)$$

$$S3=(0,0,0,+1,+1,-1,0,0,0,0,0,0)$$

$$S4=(0,0,0,0,0,0,0,0,0,-1,-j,-1)$$

Note that due to the sum-difference property, the following sequences are also complementary:

$$S1+S2=(+1,+1,-1,0,0,0,0,+1,+j,+1,0,0,0)$$

$$S3+S4=(0,0,0,+1,+1,-1,0,0,0,0,-1,-j,-1)$$

Such groups of six subcarriers, comprising two clusters, can be assigned to a user demanding a higher data rate. A user with an even higher data rate demand can be assigned all four clusters. The preamble sequence, which consists of all four parts, is also one of a complementary pair, based on the sum-difference property, $$S1+S2+S3+S4=(+1,+1,-1,+1,+1,-1,0,+1,+j,+1,-1,-j,-1)$$

and so is S2 +S3:

$$S2+S3=(0,0,0,+1,+1,-1,0,+1,+j,+1,0,0,0)$$

In the example created above, a hierarchical set of preambles, in which four subsequences with good PAPR properties in the transform domain, were aggregated into longer sequences with 6 and 12 subcarriers, each satisfying the good PAPR property.

Another example assumes that for some reason it is desired to spread apart the subcarriers in each of the groups. Then one can start with interleaving with zeros, and then continue with utilization of the sum-difference property to maintain complementarity:

$$S1=(+1,0,+1,0,-1,0,0,0,0,0,0,0)$$

$$S2=(0,0,0,0,0,0,+1,0,+j,0,+1,0)$$

$$S3=(0,+1,0,+1,0,-1,0,0,0,0,0,0)$$

$$S4=(0,0,0,0,0,0,0,-1,0,-j,0,-1)$$

Resulting in $$S1+S2=(+1,0,+1,0,-1,0,0,+1,0,+j,0,+1,0)$$

$$S3+S4=(0,+1,0,+1,0,-1,0,0,-1,0,-j,0,-1)$$

$$S1+S2+S3+S4=(+1,+1,+1,+1,-1,-1,0,+1,-1,+j,-j,+1,-1)$$

Note that in the examples above a hierarchy is created of complementary sequences: S1, S2, S3 and S4; then S1+S2 and S3+S4, which is actually a shifted S1-S2, and then the uppermost level is (S1+S2)+(S3+S4). The creation of the hierarchy utilizes the steps of shifting and add-subtract operations to generate the desired set of values.

The constructions shown above generalize naturally to a large variety of cases. While the focus is on a "trivial example" of four groups with a basic group of size 3, the hierarchical construction generalizes to any hierarchy with $2_K$ groups, and any basic subcarrier group size for which a complementary pair is available. The basic groups can be clustered or spread apart; can be modified to include extra spaces, such as by skipping the center subcarrier and using different ways of ordering groups into pairs.

In the examples above aggregation of three clusters does not yield a complementary sequence, and indeed, the PAPR properties of such combinations are worse. In general, if the system designer desires to use only preambles with 3 dB maximum PAPR, then there are restrictions, which need to be imposed on the allocation of subcarrier groups to users. Another limitation of the described method is that it does not address the case of irregularly spaced subcarriers.

For completeness, the following sizes for which pairs are known to exist are listed:
any power of 2;
binary sequences of length 10, 26;
quadriphase sequences of length 3, 5, 13; and
if a sequence of length M exists, then also sequences of length $M*2_K$ exist.
For example, binary sequences of length 20 and 52 and quadriphase sequences of length 6 do exist.
If pairs of sequences of lengths M, N exist, then also sequences of length 2 MN exist. For example, quadriphase sequences of length 18 (2*3*3), 30 (2*3*5) and 50 (2*5*5) exist, as well as binary sequences of length 200 (2*10*10).

There are additional important transformations preserving the complementarity property, such as sign change or complex rotation of one of the sequences, as well as order reversal and conjugation of one of the sequences. Those additional transformations can be used in conjunction with previously described methods to enrich the amount of preamble sets, or to search for combinations which yield better properties when sets of subcarrier groups, which are of a size other than a power of 2, need to be used.

Two examples of practical importance are now introduced. Assume an OFDMA system, which utilizes FFT size of 256, and has 208 active subcarriers. It is preferable to use 4 subchannels of 52 subcarriers each. It is assumed that the subcarriers in each subchannel are contiguous, and that the center subcarrier is not used. In such case the following construction is used:

$S1=(A_{26},B_{26},0_{26},0_{26},0,0_{26},0_{26},0_{26},0_{26})$ $S2=(0_{26},0_{26},A_{26},-B_{26},0,0_{26},0_{26},0_{26},0_{26})$ $S3=(0_{26},0_{26},0_{26},0_{26},0,A_{26},B_{26},0_{26},0_{26})$ $S4=(A_{26},B_{26},0_{26},0_{26},0,0_{26},0_{26},-A_{26},B_{26})$ $S1+S2=(A_{26},B_{26},A_{26},-B_{26},0,0_{26},0_{26},0_{26},0_{26})$ $S3+S4=(0_{26},0_{26},0_{26},0_{26},0,A_{26},B_{26},-A_{26},B_{26})$ $S1+S2+S3+S4=(A_{26},B_{26},A_{26},-B_{26},0,A_{26},B_{26},-A_{26},B_{26})$,

Where $0_{26}$ is a vector of 26 zeros.

In this case the $A_{26}$ and $B_{26}$ are binary Golay sequences of length 26, and all the sequences above can be shown to be complementary due to the properties of concatenation or spaced concatenation of shorter sequences. The same goal can be achieved with quadriphase sequences starting with a kermel of length 13. For the case of 200 active subcarriers, quadriphase sequences of length 50 can be used as a kernel.

The following exemplifies a design for a clustered OFDMA system, as in [3]. Assume FFT size of 256 of which 208 are active subcarriers. It is preferable to use 4 subchannels of 52 subcarriers each, however this time the subcarriers of each subchannel are arranged in 4 clusters of 13 subcarriers. In the example below the center subcarrier is not used. In such case the following construction is used:

$S1=(A_{13},0_{13},0_{13},0_{13},B_{13},0_{13},0_{13},0_{13},0, A_{13},0_{13},0_{13},0_{13}, -B_{13},0_{13},0_{13},0_{13})$ $S2=(0_{13},0_{13},A_{13},0_{13},0_{13},0_{13},B_{13},0_{13},0,0_{13},\ _{13},-A_{13},0_{13}, 0_{13},0_{13},B_{13},0_{13})$ $S3=(0_{13},A_{13},0_{13},0_{13},0_{13},B_{13},0_{13},0_{13},0,0_{13},A_{13},0_{13},0_{13}, 0_{13},-B_{13},0_{13},0_{13})$ $S4=(0_{13},0_{13},0_{13},-A_{13},0_{13},0_{13},0_{13},-B_{13},0,0_{13},0_{13},0_{13},0_{13}, A_{13},0_{13},0_{13},0_{13},-B_{13})$ $S1+S2=(A_{13},0_{13},A_{13},0_{13},B_{13},0_{13},B_{13},0_{13},0,A_{13},0_{13},- A_{13},0_{13},-B_{13},0_{13},B_{13},0_{13})$ $S3+S4=(0_{13},A_{13},0_{13},-A_{13},0_{13},B_{3},0_{13},-B_{13},0,0_{13},A_{13}, 0_{13},A_{13},0_{13},-B_{13},0_{13},-B_{13})$ $S1+S2+S3+S4=(A_{13},A_{13},A_{13},-A_{13},B_{13},B_{13},B_{13},-B_{13},0, A_{13},A_{13},-A_{13},A_{13},-B_{13},-B_{13},B_{13},-B_{13})$, where $A_{13}$ and $B_{13}$ are quadriphase complementary sequences reported by Frank [5], and $0_{13}$ is a vector of 13 zeros.

Finally, designation is done of all the subsets of subcarriers satisfying the complementary property for possible OFDMA allocation for a set of preambles 270.

The present invention does not derive all the cases of subcarrier allocation strategies. Nevertheless, it allows generating sets of preambles for numerous practical and important scenarios.

While the above description contains many specifities, and is mainly based on examples. These should not be construed as limitations on the scope of the invention, but rather only as examples of the preferred embodiments. Those skilled in the art will envision other possible variations that are within its scope. Accordingly, the scope of the invention should be determined not by the embodiment illustrated, but by the appended claims and their legal equivalents.

APPENDIX—PAPR PROPERTY OF COMPLEMENTARY SEQUENCES

The proof of the PAPR property is presented as follows:
By applying Parseval's identity, it follows that the sum of their power spectra is a constant over frequency.

$R_A(t)+R_B(t)=$delta$(t) \leftrightarrow S_A(w)+S_B(w)=$const$(w)$, where $R_x(t)$ is the autocorrelation of sequence $X(t)$ and $S_x(w)$ is the magnitude-squared of the Fourier transform of sequence X.

From here it is concluded that if A and B have equal energy, then avg$(S_A(w))=$avg$(S_B(w))=$const$(w)/2$, and since $0=<S(w)$, then $0=<S_A(w)=<2*$avg$(S_A(w))$, $0=<S_B(w)=<2*$avg$(S_B(w))$, meaning that neither $S_A(w)$ nor $S_B(w)$ exceed twice their average value over frequency.

Note that in the proof above the sequences A and B are described as time domain sequences, and the PAPR property is satisfied in the frequency domain. In the OFDM application the dual property is used in which the sequences are in frequency domain, and the conclusion is that the time domain waveforms satisfy the PAPR<2 property.

What is claimed is:

1. A method for carrying out communications in an Orthogonal Frequency Division Multiplexing (OFDM) based multiple access communication system, wherein said method comprises boosting average power of preamble-carrying OFDM symbols of preambles having low Peak-to-Average Power Ratio (PAPR) relatively to the average power of data-carrying OFDM symbols and wherein each of said preambles provide low PAPR for a plurality of subsets of subcarriers.

2. The method according to claim 1, wherein the preambles are boosted in order to improve the channel estimation accuracy and burst detection probability.

3. The method according to claim 1, wherein the preambles are generated by mathematical construction.

4. The method according to claim 1, wherein the preambles are generated as a result of computer search.

5. The method according to claim 1, wherein the preambles are arranged in a hierarchal set of different size.

6. A method for carrying out communications in an Orthogonal Frequency Division Multiple Access (OFDMA) communication system, wherein said method comprises providing said communications as low-PAPR preambles, in which the preambles are complementary sequences for any allowed allocation of subcarriers to at least one user.

7. The method according to claim 6, wherein the subcarriers are assigned to at least one user in groups of three consecutive numbers.

8. The method according to claim 6, wherein the preambles are hierarchically generated complementary sequences based on seed complementary sequences.

9. The method according to claim 8, based on a complementary pair, wherein their autocorrelations add up to a delta function.

10. The method according to claim 8, based on a complementary pair, wherein the element-wise interleavings of the complementary pair are another complementary pair.

11. The method according to claim 8, wherein the complementary sequences include complex numbers.

12. A method for carrying out communications in an Orthogonal Frequency Division Multiplexing (OFDM) communication system, wherein said method comprises boosting average power of preamble-carrying OFDM symbols of preambles having low Peak-to-Average Power Ratio(PAPR) relatively to the average power of data carrying OFDM symbols, and wherein said preambles are complementary sequences.

13. The method according to claim 12, wherein the preambles are boosted in order to improve the channel estimation accuracy and burst detection probability.

14. The method according to claim 12, wherein the preambles are generated by mathematical construction.

15. The method according to claim 12, wherein the preambles are generated as a result of a computer search.

16. The method according to claim 12, wherein the preambles are arranged in a hierarchal set of different size.

17. The method according to claim 12, wherein the preambles are hierarchically generated complementary sequences based on seed complementary sequences.

18. The method according to claim 17, based on a complementary pair, wherein their autocorrelations add up to a delta function.

19. The method according to claim 17, based on a complementary pair, wherein the element-wise interleavings of the complementary pair are another complementary pair.

20. The method according to claim 9, wherein the complementary sequences include complex numbers.

* * * * *